United States Patent [19]
Michal et al.

[11] Patent Number: 6,108,086
[45] Date of Patent: Aug. 22, 2000

[54] SYSTEM AND METHOD OF STABILIZING THE SCALE FACTOR SHIFT IN FIBER OPTIC GYROSCOPES USING A SPECTRAL MONITOR ARRAY

[75] Inventors: Ronald J. Michal, Wrightwood; David M. Rozelle, Woodland Hills; John P. Rahn, West Hills, all of Calif.

[73] Assignee: Litton Systems, Inc., Woodland Hills, Calif.

[21] Appl. No.: 09/262,795

[22] Filed: Mar. 4, 1999

[51] Int. Cl.[7] .................................................. G01C 19/72
[52] U.S. Cl. ............................................................ 356/350
[58] Field of Search ..................................... 356/350, 345; 385/12, 14; 250/227.19, 227.27

[56] References Cited

U.S. PATENT DOCUMENTS

| | | | |
|---|---|---|---|
| 5,108,183 | 4/1992 | Fling et al. | 356/350 |
| 6,025,915 | 2/2000 | Michal et al. | 356/350 |

*Primary Examiner*—Samuel A. Turner
*Attorney, Agent, or Firm*—Price, Gess & Ubell

[57] ABSTRACT

A system and method for providing scale factor stabilization of a broadband light source used in fiber optic gyroscopes is provided. A primary bandpass filter is positioned in the propagation path of the light emitted by the broadband light source to narrow the spectral width of the optical signal transmitted to the fiber optic gyroscope, which reduces the centroid wavelength shift resulting when the broadband light source is exposed to ionizing radiation and other harsh environmental conditions. The filtered optical signal is then passed through the fiber optic gyroscope, where the filter optical signal is processed to measure the amount of rotation of the fiber optic gyroscope. The scale factor stabilization system further includes the spectral monitor array arranged to perform direct optical wavelength measurements of the filtered optical signal to determine whether a scale factor shift in the optical signal has occurred. When a scale factor shift is detected, the detected scale factor shift is used in a compensation algorithm to correct the scale factor of the optical signal. By monitoring the scale factor shift and adjusting the values measured by the fiber optic gyroscope in accordance with the detected scale factor shift, the accuracy of the fiber optic gyro can be improved to a fraction of a part-per-million.

19 Claims, 7 Drawing Sheets

SYSTEM AND METHOD OF STABILIZING THE SCALE FACTOR SHIFT IN FIBER OPTIC GYROSCOPES USING A SPECTRAL MONITOR ARRAY

BACKGROUND OF THE INVENTION

1. Field of the Invention

The present invention relates generally to an optical signal source for a fiber optic interferometric sensor, and specifically to a broadband optical signal source for a fiber optic gyroscope. The present invention provides an apparatus for monitoring and correcting scale factor shifts in the light coming from the broadband fiber source.

2. Description of Related Art

Many fiber optic gyroscopes use a broadband fiber source to provide the light that is introduced into a fiber sensing coil for detecting rotation of the gyros. The typical broadband fiber source used in fiber optic gyros is a reverse pump, single-pass broadband fiber source 100. Such a configuration is shown in FIG. 1. This configuration uses a pump light source, such as a pump laser diode, that emits light at a given wavelength which is directed through a length of erbium doped fiber (EDF). The EDF has a core that has been doped with one or more of the rare earth family of elements, such as erbium. The light from the pump light source is introduced as an excitation signal into the EDF, which in turn causes the fiber to emit a light characteristic of the dopant. When an erbium doped fiber is supplied with a source of energy being pumped into the fiber, such as for example a wavelength of 1480 nm generated by the pump laser diode, the electrons in the erbium absorb the energy and jump to a higher energy state. This energy may later be released as light emitted from the EDF. When erbium is pumped with a laser at the appropriate wavelength, it emits a light having a wavelength between approximately 1525 to 1565 nanometers (nm). This light emitted from the broadband fiber source 100, which is broadband in nature, is then coupled into the fiber optic gyro 102. In the fiber optic gyro 102, the light passes from a fiber optic coupler 104 used as a multiplexer (MUX) through a multifunction integrated optics chip (MIOC) 106, which forms and processes counter-propagating waves used in fiber optic rotation sensor systems. The counter-propagating waves are then input into a fiber optic sensing coil 108. A phase shift between the counter-propagating waves develops as a result of the rotation of the fiber optic sensing coil 108. The counter-propagating waves are directed to a gyro photodetector 110, where the intensity of the light emitted from the sensing coil 108 is measured to determined the amount of rotation of the gyro. The light in the sensing coil 108 provides phase information which can be related to the gyro rotation rate through a term called scale factor. The scale factor is linearly related to the average wavelength of the light coming from the broadband fiber source 100.

Because of the broad spectral width of this light source, the scale factor becomes related to the weighted average of the spectrum, otherwise referred to as the centroid wavelength. It has been shown that when the erbium doped fiber (and to a lesser degree the other fiber optic components, such as the sensing coil 108) are exposed to harsh environments, changes in the broadband fiber source can cause a large shift in the centroid wavelength, resulting in a large scale factor error. For instance, exposure to ionizing radiation can adversely affect the centroid wavelength of light sources using the EDF. FIG. 2 illustrates the effects of ionizing radiation on the spectrum of the EDF light source over a continuum of levels of ionizing radiation. A typical spectrum for the broadband light source before exposure to ionizing radiation is represented by the graph at 0% radiation. Full exposure to a predetermined dose of ionizing radiation is represented by the graph at 100% radiation, where the remaining graphs show the spectrums of the broadband light source at doses of ionizing radiation which are fractional amounts of the 100% dose. As can be seen, the relative intensity of the EDF light source decreases with respect to the pre-exposure spectrum and the shape of the spectrum of the broadband light sources changes as the total dose of ionizing radiation increases. The 100% dose of ionizing radiation resulted in an approximately a 500 ppm shift in the centroid wavelength from the pre-exposure spectrum.

The spectrum from a broadband light source is made up of a composite of several emission peaks. As the radiation damages the EDF, the different emission peaks experience different levels of attenuation. This has the effect of shifting the centroid wavelength. The shift in the centroid wavelength can correspond to a scale factor shift over a 1000 parts per million. For fiber optic gyroscopes being used in applications requiring a high degree of accuracy, this creates an unacceptable level of error. There is a need for stabilization of the scale factor of a broadband fiber source used in fiber optic gyros when exposed to ionizing radiation and other external influences.

One solution for stabilizing the scale factor of a broadband fiber source is described in co-pending U.S. patent application Ser. No. 09/104,496 filed Jun. 25, 1998, and assigned to Litton Systems, Inc., which discloses using a broadband fiber filter to only allow a bandwidth of light narrower than the spectral width of the broadband light source to propagate through to the fiber optic gyro while attenuating all light outside of its operating bandwidth. This narrows the spectral width of the broadband fiber source which, in turn, reduces the centroid wavelength shift resulting when the EDF is exposed to ionizing radiation. Referring now to FIG. 3, a graphical illustration of the reduction in centroid wavelength shift for several bandpass filters is shown for the broadband fiber source of FIG. 2. As set forth above, a 500 ppm centroid wavelength shift occurred after exposing an EDF source made with HG-980 fiber to predetermined dose of ionizing radiation. After positioning a bandpass filter after the broadband fiber source, the centroid wavelength shift is reduced significantly, where lines 30, 32 and 34 of FIG. 3 show the respective reduced centroid wavelength shift for filters having a bandwidth of 12 nm, 10 nm, and 8 nm. Given the overall shape of the broadband fiber source spectrum, it can be seen that the best centroid wavelength shift reductions occur when the filter center wavelength is between 1558 to 1559 nm.

The best centroid wavelength shift reductions typically result from bandpass fiber filters having the smallest bandwidths. However, the intensity of the smaller bandwidth signals tend to be weaker than the pre-filtered broadband signals. This allows the quality of these weaker signals to be more easily degraded by noise and other undesirous factors. Thus, there is a need for an apparatus which provides scale factor stabilization of a broadband fiber source while maintaining the intensity of the light signal at a high enough intensity so as not to easily be degraded by noise. Moreover, for applications requiring extreme precision, a scale factor accuracy of a fraction of a part-per-million is required through adverse environments. Thus, there is a need for a system which provides scale factor stabilization by monitoring and correcting the centroid wavelength shift of the spectrum of the broadband fiber source when exposed to ionizing radiation.

SUMMARY OF THE INVENTION

The present invention provides a system for stabilizing the scale factor of a broadband light source used in fiber optic gyros when exposed to harsh environmental conditions, such as ionizing radiation. The present invention also improves the accuracy of fiber optic gyros by minimizing the centroid wavelength shift of the spectrum of the broadband fiber source when exposed to ionizing radiation and by further correcting measured scale factor shifts in the light coming from the broadband light source.

The present invention provides scale factor stabilization of a broadband fiber optic signal source used in fiber optic gyroscopes by positioning a primary source fiber optic filter device in-line with the light emitted by the broadband light source to attenuate light outside of the bandwidth of the filter device. The fiber optic filter device is preferably a fiber optic bandpass filter that allows a bandwidth of light narrower than the spectral width of the broadband light source to propagate through while attenuating all light outside of its operating bandwidth. This narrower spectral width reduces the centroid wavelength shift which results when the broadband light source is exposed to ionizing radiation and other harsh environmental conditions.

After passing through the primary source bandpass filter, the light emitted from the broadband fiber source is directed into the fiber optic gyro through a fiber optic coupler. In the fiber optic gyro, the light passes from the fiber optic coupler through a multifunction integrated optics chip (MIOC) to form and process counter-propagating waves used for detecting fiber optic sensor rotation. The counter-propagating waves are then input into a fiber optic sensing coil, where a phase shift between the counter-propagating waves develops as a result of the rotation of the fiber optic sensing coil. The light from the fiber optic sensing coil is then directed back through the fiber optic coupler to a gyro photodetector which detects the phase information from the counter-propagating waves to measure the amount of rotation of the fiber optic sensing coil.

Furthermore, the scale factor stabilization system includes a spectral monitor array connected to the fiber optic coupler for performing direct optical wavelength measurements which can be used to compensate for wavelength shifts in the light from the broadband fiber source. The spectral monitor array receives the counter-propagating waves transmitted from the fiber optic sensing coil. The spectral monitor array includes a plurality of secondary bandpass filters, where each secondary bandpass filter has a bandpass located at a wavelength inside of the bandpass of the primary source bandpass filter. Each of the secondary bandpass filters are connected to a respective photodetector for measuring the intensity of the signals coming from the secondary bandpass filters. The intensity coming from each of the secondary bandpass filters is then monitored and analyzed to determine whether a shift in the scale factor of the broadband light source has occurred. Any detected scale factor shift measured from the outputs of the secondary bandpass filters is then used in a compensation algorithm to correct the scale factor of the optical signal. By monitoring the scale factor shift and adjusting the values measured by the gyro photodetector in accordance with the detected scale factor shift, the accuracy of the fiber optic gyro can be improved to a fraction of a part-per-million.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a scale factor stabilization system for a broadband fiber source used in fiber optic gyroscopes in harsh environments.

Figure 1:
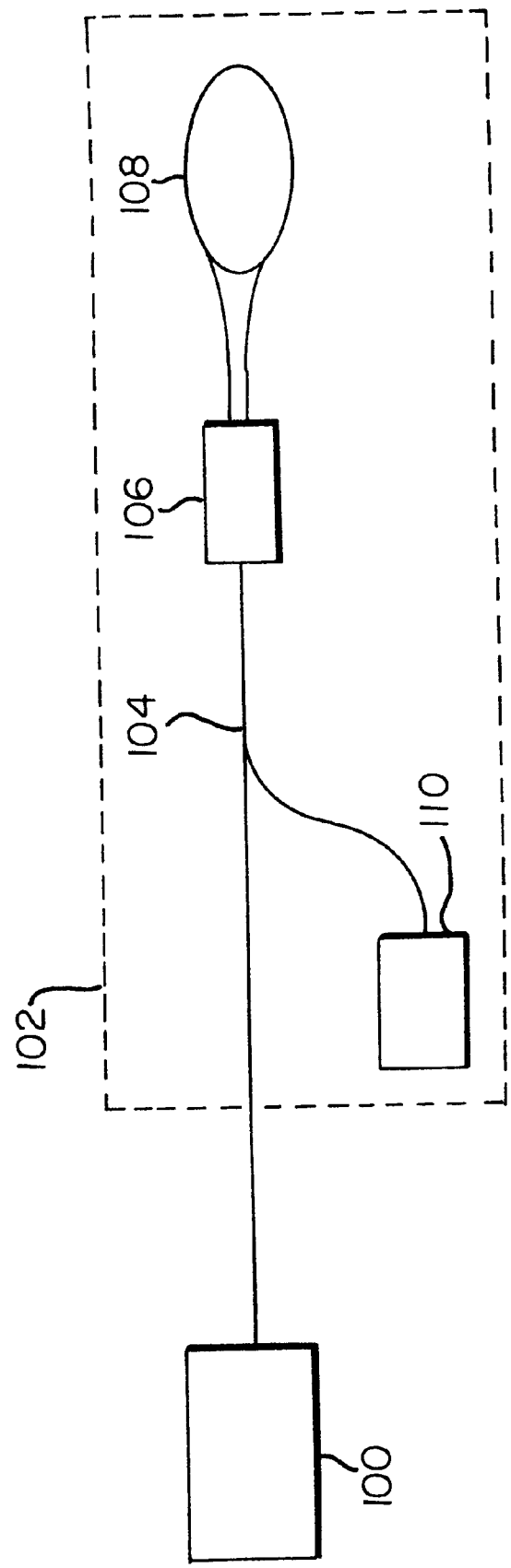
FIG. 1 is schematic illustration of a typical fiber optic gyroscope architecture.
Figure 2:
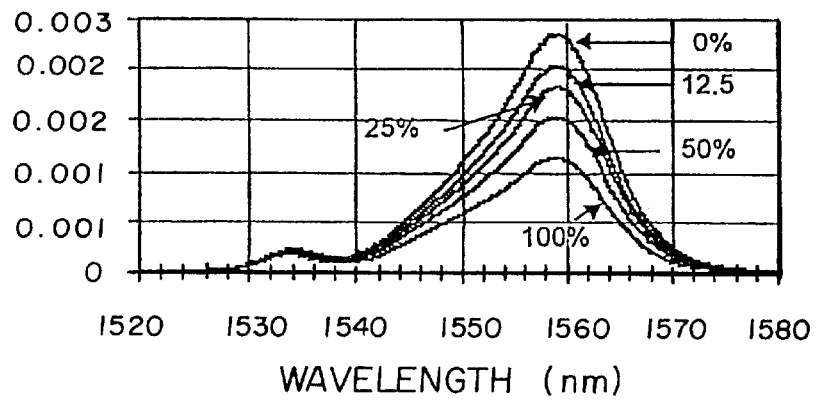
FIG. 2 is graphical illustration of the effects of ionizing radiation on the spectrum of a broadband light source over a continuum of radiation levels.
Figure 3:
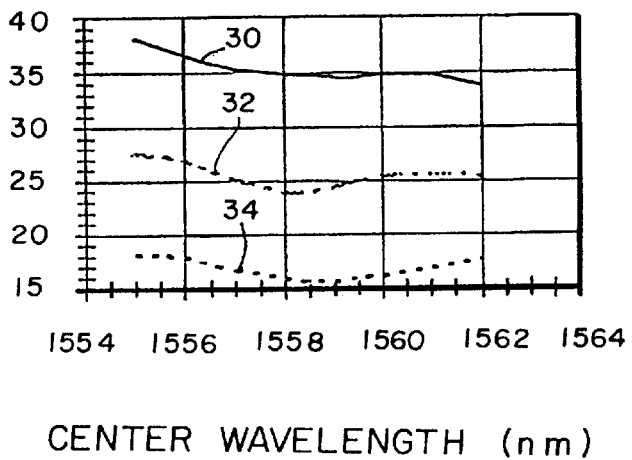
FIG. 3 is a graphical illustration of the reduction in centroid wavelength shift resulting from exposure to ionizing radiation when primary bandpass filters of 12 nm, 10 nm, and 8 nm are utilized.
Figure 4:
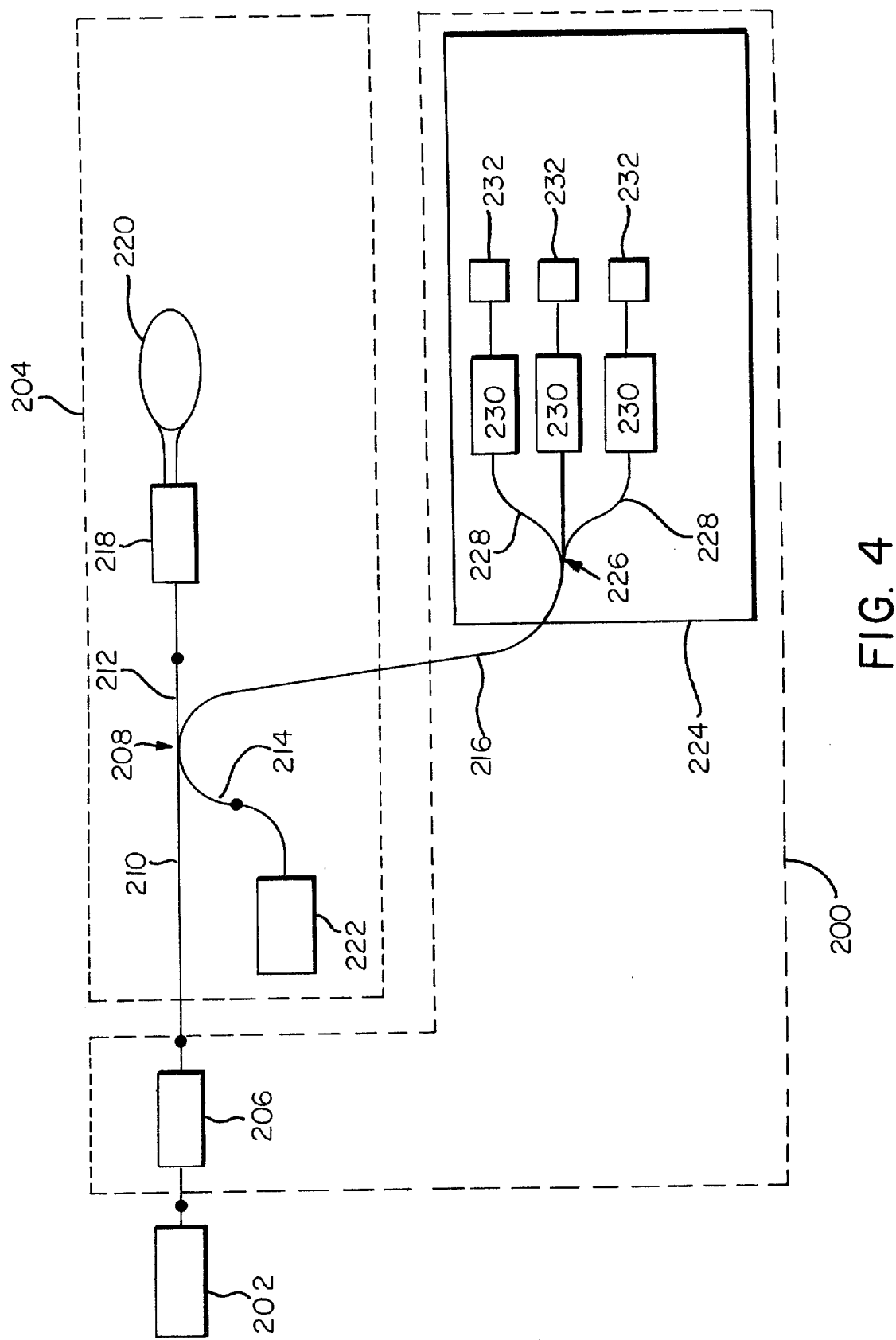
FIG. 4 is a schematic illustration of the scale factor stabilization system for a broadband fiber source shown in conjunction with a fiber optic gyroscope in accordance with a preferred embodiment of the present invention.

Referring now to FIG. 4, the scale factor stabilization system 200 for a broadband light source 202 and a fiber optic rotation sensor 204 according to the present invention is illustrated. The broadband light source 202 is arranged to provide optical signals to the fiber optic rotation sensor 204, such as a fiber optic gyroscope. The broadband light source 202 may comprise any type of broadband optical signal source, where a typical arrangement for generating a broadband light includes a pump laser diode arranged to provide pump light to an optical gain fiber having a core doped with erbium or other element of the rare earth family. The pump light diode typically generates a pump light wavelength of approximately 1480 nm, where the erbium-doped gain fiber has a three level transition that produces a broadband optical signal having a wavelength centered around 1560 nm. U.S. Pat. No. 5,231,465, issued Jul. 27, 1992 to Huang et al. and U.S. Pat. No. 5,119,229 issued Jun. 2, 1992 to Grasso et al. disclose the use of erbium-doped cores to provide an optical signal in an optical fiber. The disclosures of U.S. Pat. Nos. 5,231,465 and 5,119,229 are hereby incorporated by reference into this disclosure.

The scale factor stabilization system 200 includes a primary bandpass filter 206 and a spectral monitor array 224.

The broadband light emitted from the gain fiber is then output from the broadband light source 202 to the fiber optic gyroscope 204, wherein a primary fiber optic bandpass filter 206 is positioned in the propagation path between the broadband light source 202 and the fiber optic gyroscope 204. The primary bandpass filter 206 attenuates all wavelengths of light outside of the bandpass of the primary bandpass filter 206, which narrows the spectral width of the light transmitted to the fiber optic gyroscope 204. The primary bandpass filter 206 acts to reduce the centroid wavelength shift that results when the broadband light source 202 and other sensitive optical components are exposed to ionizing radiation and other harsh environmental conditions. The mechanization for accomplishing this reduction in the centroid wavelength shift is made possible by the wide bandwidth of the spectrum of the broadband light source 202. The centroid wavelength is the weighted average of the broad spectrum of the broadband light source 202. The spectrum of the broadband light source is made up of a composite of several emission peaks. As the EDF in the broadband light source 202 is exposed to ionizing radiation, the different emission peaks experience different levels of attenuation, resulting in a shift of the centroid wavelength. Other optical components in the broadband light source 202 and fiber optic gyro 204 can also attenuate different wavelengths across the broadband spectrum when exposed to ionizing radiation. The primary bandpass filter 206 has the characteristic of attenuating light outside of its region of operation while allowing a bandwidth of light that is narrower than the spectral width of the broadband light source 202 to propagate through. Thus, the filtered signal does not possess all of the emission peaks of the full spectrum of the broadband light source 202. It is the full intention of the inventors of the present invention that the above-described bandpass filtering can be performed by any type of bandpass filter device conforming with the operation of the present invention.

In the fiber optic gyro 204, the optical signal propagates to a fiber optic coupler 208, such as a 2×2 multiplexer (MUX). The MUX 208 has four fiber optic legs 210, 212, 214, and 216 extending therefrom, where one of the fiber optic legs 210 is connected to receive signals from the primary bandpass filter 206. Another of the fiber optic legs 212 passes the optical signal to a multi-function integrated optics chip (MIOC) 218, which includes well-known components used to form and process the counter-propagating waves used in fiber optic rotation sensor systems. Suitable MIOC structures are disclosed in U.S. Pat. Nos. 4,915,503 (Pavlath), U.S. Pat. No. 4,997,282 (Pavlath), and U.S. Pat. No. 5,037,205 (Pavlath), all of which are assigned to Litton Systems, Inc. The disclosures of U.S. Pat. Nos. 4,915,503, 4,997,282, and 5,037,205 are incorporated by reference into this disclosure.

The MIOC 218 is further connected to a fiber optic sensing coil 220. The MIOC 218 processes light input into the fiber optic gyro 204 to provide counter-propagating waves to the fiber optic sensing coil 220. Rotation of the fiber optic gyro 204 about a line perpendicular to the plane of the sensing coil 220 produces a phase difference in the counter-propagating waves by means of the Sagnac effect. After traversing the sensing coil 220, the counter-propagating waves combine in the MIOC 218 and form an interference pattern. The combined counter-propagating waves then exit the MIOC 218 and enter the MUX 208. The fiber optic leg 214 of the multiplexer then guides the combined waves a photodetector 222 which generates electrical signals corresponding to the intensity of the interference pattern produced by combining the counter-propagating waves that have propagated through the sensing coil 220. Signal processing circuitry (not shown) then may be used to measure rotation of the fiber optic gyro 204 by relating the phase information in the interference pattern to the gyro rotation rate through the scale factor of the optical signal coming from the broadband light source 202.

The fiber optic leg 216 of the MUX 208 guides the combined waves output by the MIOC 218 to a spectral monitor array 224 which detects whether wavelength shifts in the light from the broadband light source 202 have occurred. The fiber optic leg 216 is connected to a 1×N coupler 226 which splits the light into N different fiber elements 228. An array of secondary bandpass filters 230 are connected to the fiber elements 228, such that each fiber element 228 is connected to a respective secondary bandpass filter 230. Each of the secondary bandpass filters 230 has a bandpass located at a wavelength inside of the bandpass of the primary source bandpass filter. Each of the secondary bandpass filters is connected to a respective photodetector 232 for measuring the intensity of the signals coming from the secondary bandpass filters 230. The intensity coming from each of the secondary bandpass filters 230 is analyzed to determine whether the overall shape of the spectrum of the primary bandpass filter 206 has changed and, in turn, whether a shift in the centroid wavelength of the light from the broadband light source 202 has occurred.

The secondary bandpass filters 230 may comprise Bragg grating bandpass filters or any other type of bandpass filter. In the preferred embodiment of the present invention shown in FIG. 4, three secondary bandpass filters 230 are utilized such that the value of 'N' in the 1×N coupler 226 is equal to 3. Each of the three secondary bandpass filters 230 have a bandpass within the bandpass of the primary bandpass filter 206. Each of the secondary bandpass filters 230 preferably have a separate bandpass from the other secondary bandpass filters 230, so secondary bandpass filters 230 can monitor a different respective portion of the spectral width of the primary bandpass filter 206. In order to monitor the overall spectral width of the primary bandpass filter 206, the aggregate bandwidth of all of the secondary bandpass filters 230 should substantially equal the bandwidth of the primary bandpass filter 206. However, it is understood that the secondary bandpass filters 230 may possess any bandwidth within the bandpass of the primary bandpass filter 206, where their wavelengths may even overlap one another.

The intensity of the signals output by the three secondary bandpass filters 230 is measured by the photodetectors 232 respectively connected to the secondary bandpass filters 230. The output of the photodetectors 232 will either be a current value or voltage value which corresponds to the intensity of the signal passed by the respective bandpass filter 230 at its corresponding wavelength. The intensity of the three signals measured by the photodetectors 232 are then analyzed mathematically by applying an estimator to obtain a centroid wavelength value, such as by integrating using Simpson's Rule or another similar mathematical algorithms. Using the three measured intensities, the scale factor shift associated with a shift in the centroid wavelength value can then be determined using the mathematical algorithm. For the purposes of illustration, one such mathematical algorithm using a Simpson's Rule Integration will now be described:

Simpson's Rule Integration

As described above, rotation of the fiber optic sensing coil 220 produces a phase difference in the counter-propagating waves traveling through the sensing coil 220 by means of the Sagnac effect. The expression for the Sagnac phase shift, Δϕ, in the sensing coil 220 is:

$$\Delta\phi = \frac{8\pi NA}{\lambda c}\Omega \qquad (1)$$

where N is the number of loops in the sensing coil 220, A is their average area, λ is the wavelength in vacuum of the sensing light, c is the speed of light in vacuum, and Ω is the rotation rate about the sensitive axis of the sensing coil 220. If Ω is expressed in radians per second then Δϕ is in radians. The cofactor of Ω on the right side of the equation (1) is called the scale factor. Equation (1) assumes there is only one wavelength traversing the coil and interfering at the detector. When there is a continuum of wavelengths of various spectral intensities, I(λ), then an appropriate expression for the phase shift is:

$$\Delta\phi = \frac{8\pi NA}{c}\frac{\int \frac{I(\lambda)}{\lambda}d\lambda}{\int I(\lambda)d\lambda}\Omega \qquad (2)$$

wherein the cofactor of Ω on the right side of the equation (2) is the scale factor for the continuum of wavelengths. The dependence of $\lambda^{-1}$ in expression (2) assumes that the interference of the oppositely propagating waves have been biased so that the non-rotating phase difference is non-zero, i.e. π/2, and that this phase difference is kept near this value by a closed loop servo system. Thus, the effective inverse wavelength, <1/λ>, to be used in equation (1) is really:

$$\left\langle \frac{1}{\lambda}\right\rangle = \frac{\int \frac{I(\lambda)}{\lambda}d\lambda}{\int I(\lambda)d\lambda} \qquad (3)$$

When exposed to ionizing radiation, I(λ) is modified so that <1/λ> is also modified, so that equation (2) changes which thereby changes the scale factor. However, if there are several experimental data points ranging over the full wavelength extent of I(λ), then good estimates of the change in scale factor can be made by performing numerical integrals instead of the continuous algebraic integrals indicated by equations (2) and (3).

For example, Simpson's numerical integration rule can be applied to both the numerator and denominator of equation (3). In this example, three equally spaced experimental intensity data points, $I_{-1}$, $I_0$, $I_+$, at wavelengths $\lambda_0-\delta\lambda$, $\lambda_0$, and $\lambda_0+\delta\lambda$, respectively. After neglecting terms in $\delta\lambda^2$, then after some algebra, it is found:

$$\left\langle \frac{1}{\lambda}\right\rangle - \frac{1}{\lambda_0} \approx \frac{\delta\lambda}{\lambda_0^2}\frac{I_- - I_+}{I_- + 4I_0 + I_+} \qquad (4)$$

As can be seen, the inverse wavelength is shifted due to the asymmetry of the spectrum $I_- - I_+$. In the actual scale factor error correction, any number of odd data points, N≥3, could be used and terms in $\delta\lambda^2$ would not be neglected, where equation (4) shows the basis for this method. The definition of the spectral scale factor shift (SFS) and its experimentally estimated value are $$SFS \equiv \frac{\left\langle \frac{1}{\lambda}\right\rangle - \frac{1}{\lambda_0}}{\frac{1}{\lambda_0}} \approx \frac{\delta\lambda}{\lambda_0}\frac{I_- - I_+}{I_- + 4I_0 + I_+} \qquad (5)$$

The estimated scale factor shift, SFS, indicates how the centroid wavelength has shifted. Scale factor stability is then achieved in harsh environments, such as exposure to ionizing radiation, by compensating for the wavelength shift induced errors estimated by the spectral monitor array 224 and correcting the measured rotation rate by the gyro photodetector 222 accordingly. A spectral reference would be determined when the fiber optic gyroscope 204 is calibrated, where any changes from the spectral reference detected by the spectral monitor array 224 would be used in a compensation algorithm to stabilize the scale factor of the fiber optic gyroscope 204.

There are a variety of design parameters which affect the performance of the system 200, including: (1) the center wavelength of the primary bandpass filter 206, (2) the bandwidth of the primary bandpass filter 206, (3) the number N of secondary bandpass filters 230 used in the spectral monitor array 224, (4) the spacing and wavelength of the secondary bandpass filters 230 used in the spectral monitor array 224, and (5) the bandwidth of the secondary bandpass filters used in the spectral monitor array 224. When the wavelength of the secondary bandpass filters 230 are spaced apart from one another, their wavelengths are preferably positioned at least at both edges and the center of the wavelength of the bandpass of the primary bandpass filter 206 in order to provide the best wavelength shift detection. Further, the system 200 is described with reference to the figures as having three secondary bandpass filters 230. However, it is understood to those skilled in the art that any number of secondary bandpass filters 230 can be utilized.

Figure 5:
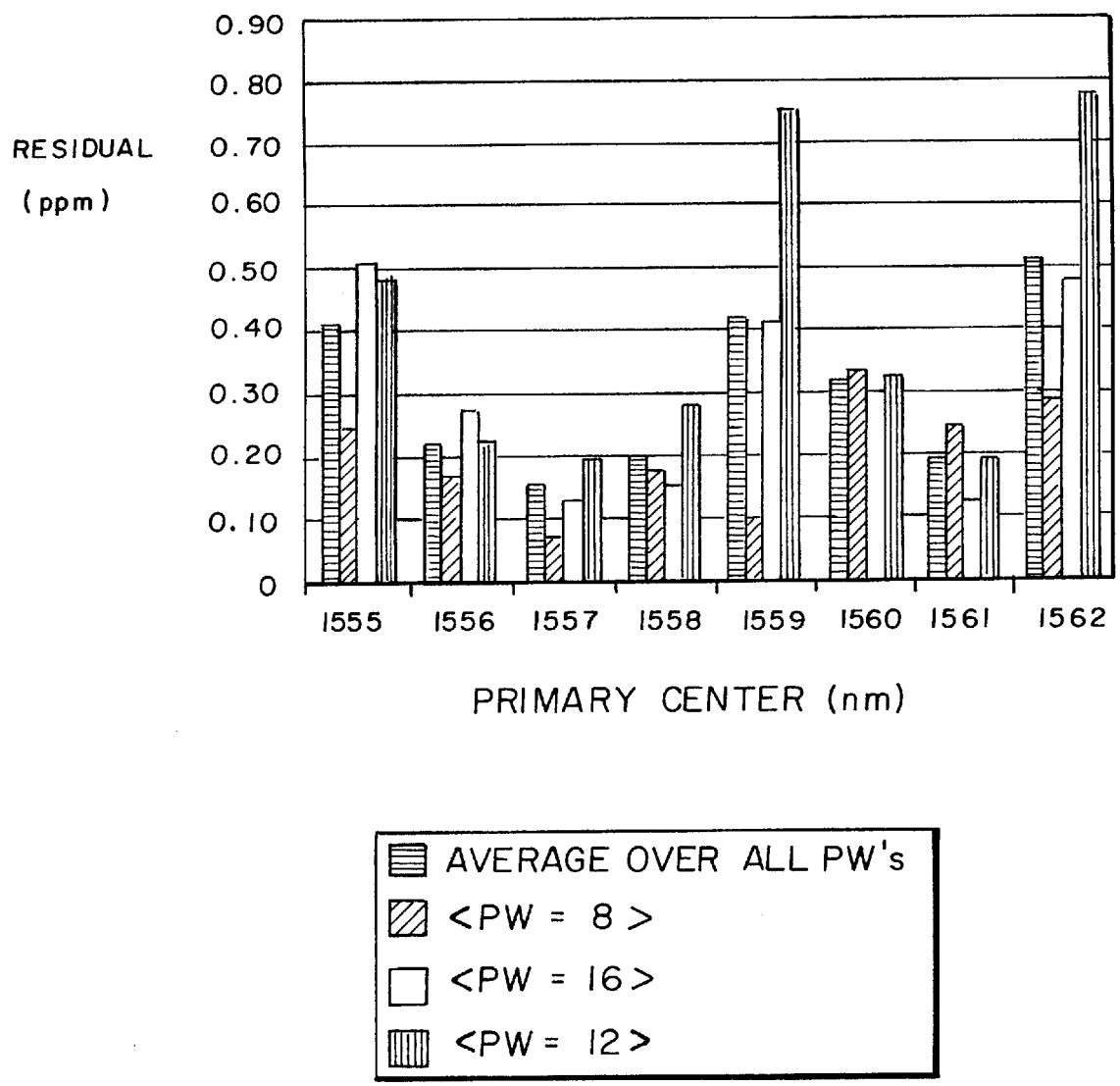
FIG. 5 is a graphical illustration of the residual scale factor error remaining over a variety of primary bandpass filter design parameters for the scale factor stabilization system of FIG. 4.
Figure 6:
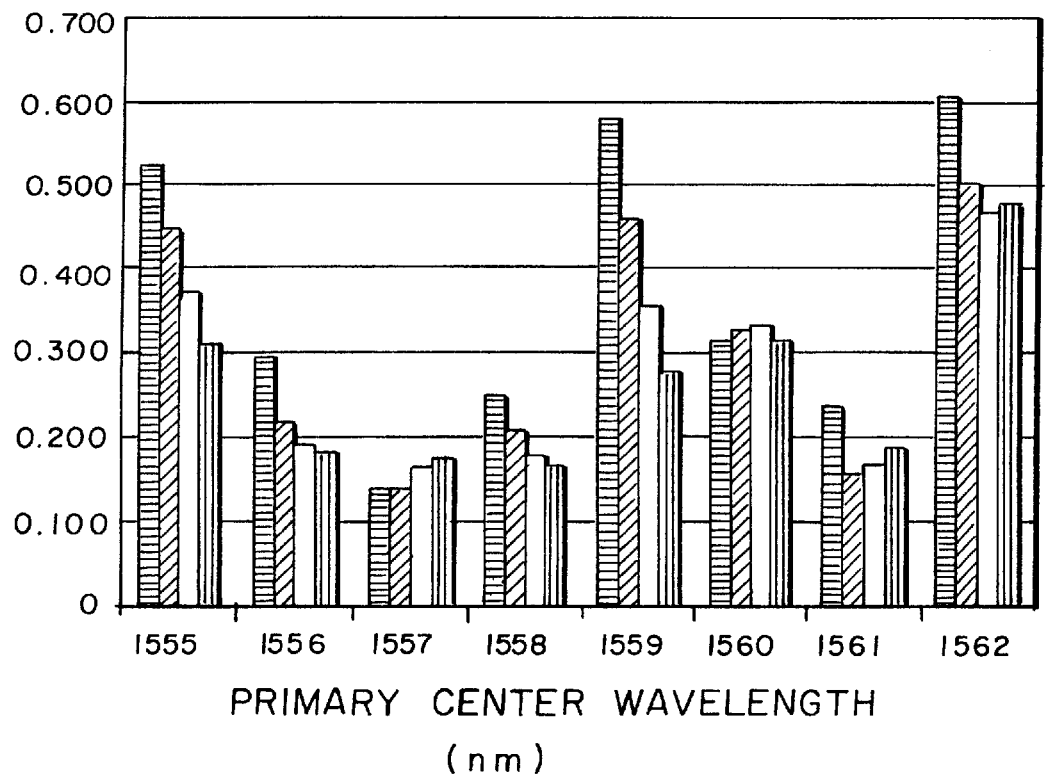
FIG. 6 is a graphical illustration of the residual scale factor error remaining over a variety of secondary bandpass filter design parameters for the scale factor stabilization system of FIG. 4.
Figure 6:
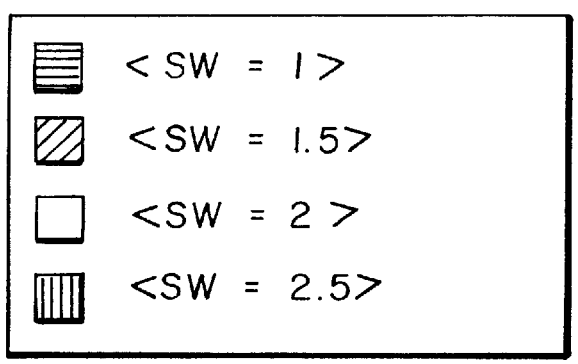

Referring now to FIG. 5, analytical results for optimizing the design parameters of the scale factor stabilization system 200 are illustrated in chart form showing the effects of varying the bandwidth and center wavelength for a plurality of different primary bandpass filter 206 values. The spacing of the secondary bandpass filters 230 was optimized in each of the system 200 designs of FIG. 5. It can be seen that a system 200 configuration with a primary bandpass filter 206 centered at 1557 nm having a bandwidth of 8 nm reduces the centroid wavelength shift to less than 0.1 ppm from the observed 500 ppm for the previously described unfiltered design. FIG. 6 further illustrates the analytical results obtained from varying the center wavelength of the primary bandpass filter 206 and the bandwidth of the secondary bandpass filters 230 for a primary bandpass filter having a bandwidth of 12 nm. As can be seen, a primary bandpass filter 206 centered at 1557 nm having a bandwidth of 12 nm and three secondary bandpass filters 230 having a bandwidth of 1.5 nm reduce the scale factor shift to a minimum.

Figure 7A:
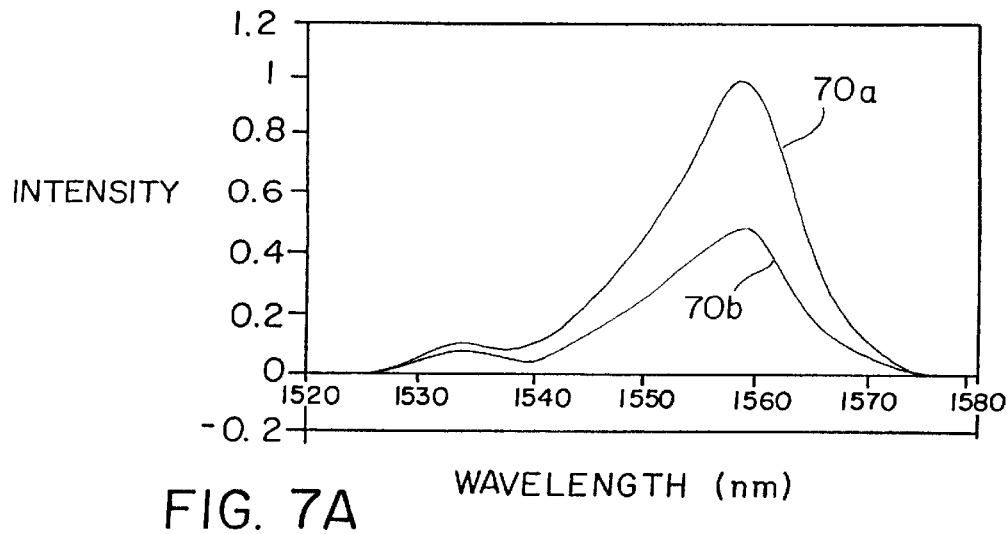
FIGS. 7A–7E are graphical illustrations of the spectrum of a light source, both before and after exposure to ionizing radiation, as it travels through the scale factor stabilization system of the present invention.
Figure 7B:
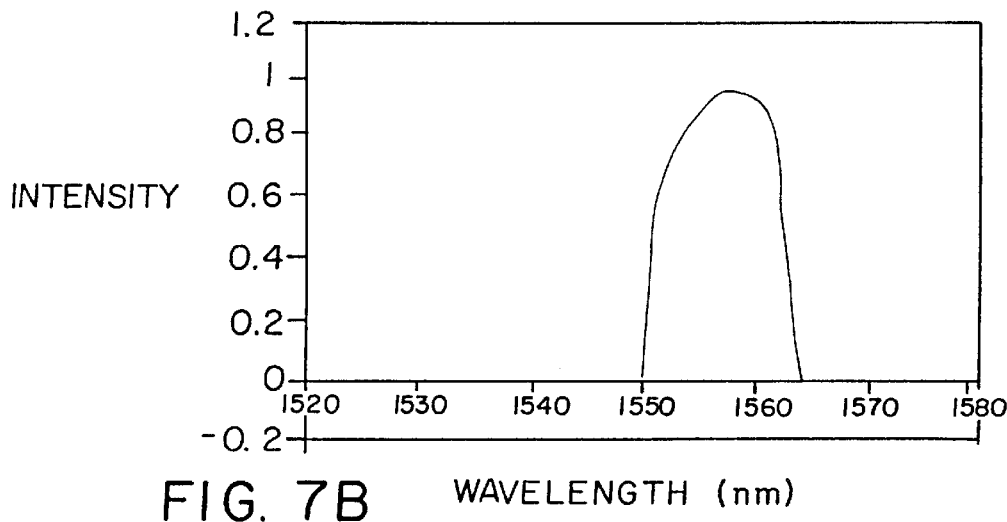
Figure 7C:
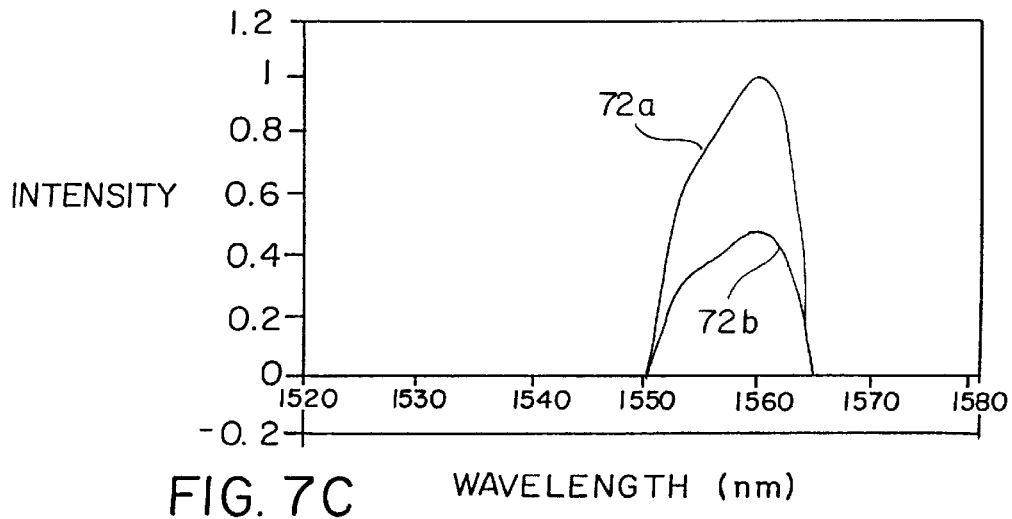

Referring now to FIGS. 7A–7D, a graphical illustration of the progression of the spectrum of broadband light source 202 through the scale factor stabilization system 200 is shown by way of example to illustrate the method in which the present invention accomplishes scale factor stabilization. In order to illustrate the effects ionizing radiation can have on the spectrum of broadband light source 202, both a pre-radiation exposure spectrum and a post-radiation exposure spectrum are shown in each of the figures. Curve 70a in FIG. 7A illustrates the broadband spectrum of the broadband light source 202 before exposure to ionizing radiation, while curve 70b illustrates the broadband light source 202 spectrum after exposure to ionizing radiation. The light from the broadband light source 202 is passed through a primary bandpass filter 206 having a selected bandpass, such as the bandpass shown in FIG. 7B. The resulting filtered spectrum output by the primary bandpass filter 206 is shown in FIG. 7C, where curves 72a and 72b represent the pre-radiation exposure spectrum and post-radiation exposure spectrum, respectively.

Figure 7D:
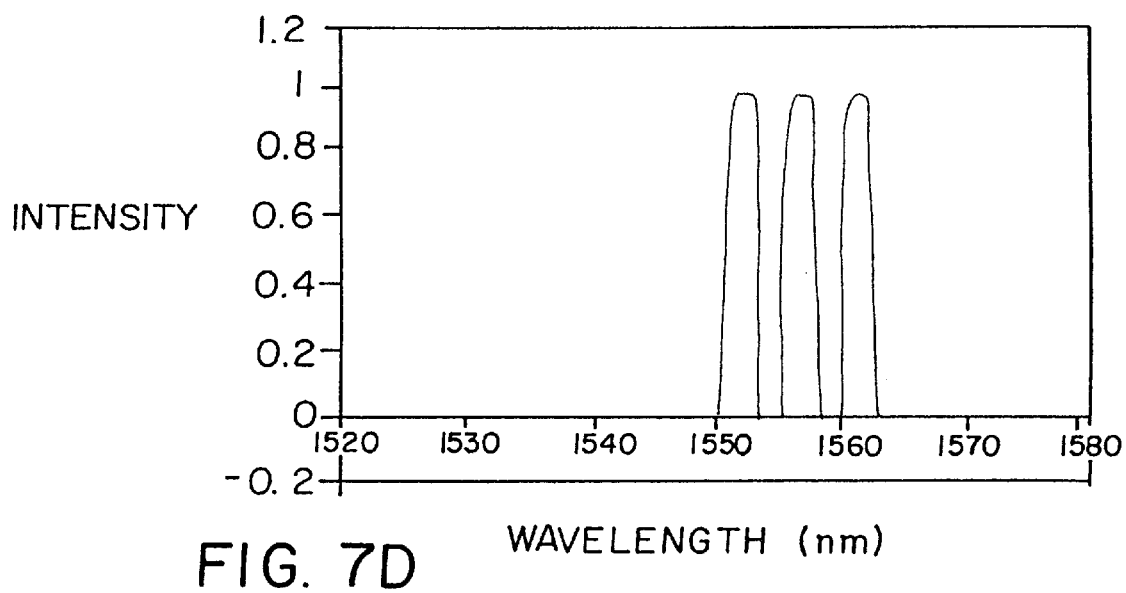
Figure 7E:
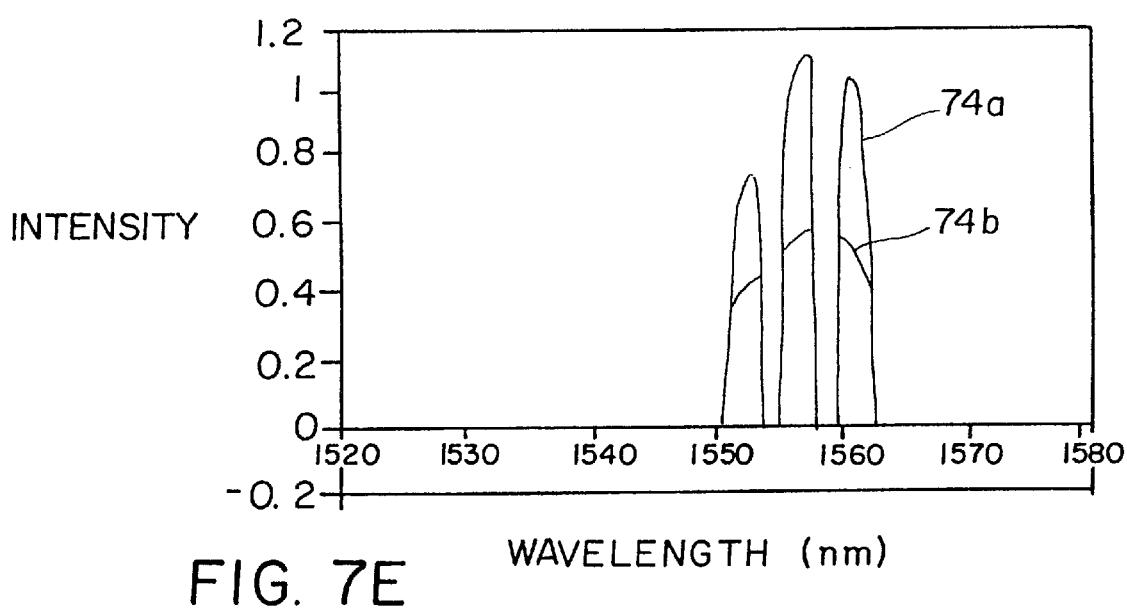

The filtered light is then passed through the fiber optic gyro 204, as described above, where a portion of the light traveling through the fiber optic gyro 204 is directed through the spectral monitor array 224. The spectral monitor array includes a plurality of secondary bandpass filters 230, each having a predetermined bandpass as illustrated in FIG. 7D for three secondary bandpass filters 230. The filtered output of the secondary bandpass filters 230 is illustrated in FIG. 7E, where curves 74a and 74b represent the pre-radiation exposure spectrum and post-radiation exposure spectrum, respectively. The intensity of the filtered output signals from the secondary bandpass filters 230 are measured by respective photodetectors 232, where the difference in intensities between the pre-radiation exposure spectrum and post-radiation exposure spectrum can be clearly seen from the FIG. 7E. The foregoing example in FIGS. 7A–7E is merely for the purposes of illustrating the method in which the present invention accomplishes scale factor stabilization and the present invention is not intended to be limited in any way to the values shown in the figures.

It is the utilization of the secondary bandpass filters 230 in conjunction with the primary bandpass filter 206 which provides the novel means for reducing the shift of the centroid wavelength of the broadband optical signal source 202 spectrum. By narrowing the spectral width of the broadband light source 202 using the primary bandpass filter 206, the centroid wavelength shift of the broadband light source spectrum is reduced when exposed to ionizing radiation by reducing the number of emission peaks affected by the radiation. The spectral monitor array then provides a mechanism for further fine tuning the scale factor shift of the broadband light source 202 by detecting changes in the spectrum of the broadband light source 202 and compensating for such changes.

As can be seen from the foregoing, a scale factor stabilization system for a broadband light source used in fiber optic gyroscopes formed in accordance with the present invention will minimize the centroid wavelength shift of the broadband source spectrum when the broadband optical signal source and other sensitive optical components are exposed to harsh environmental conditions. Moreover, by forming a scale factor stabilization system for a broadband optical signal source used in fiber optic gyroscopes formed in accordance with the present invention, a more accurate gyroscope measurement can be achieved in radiation environments by providing a mechanism for compensating for a detected scale factor shift of the broadband light source.

In each of the above embodiments, the different structures of the scale factor stabilization system for a broadband optical signal source used in fiber optic gyroscopes of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for stabilizing the scale factor of a broadband light source used in fiber optic rotation sensors, comprising:

a broadband light source which emits a broadband optical signal;

a fiber optic rotation sensor arranged to receive the optical signal from the broadband light source; the fiber optic rotation sensor including a detector which measures the rotation of the rotation sensor by processing the optical signal and analyzing a scale factor of the optical signal;

a primary bandpass filter connected in the propagation path of the optical signal between the broadband light source and the fiber optic rotation sensor, the primary bandpass filter narrowing the spectral width of the optical signal to a bandpass of the primary bandpass filter; and a spectral monitor array connected to receive at least a portion of the optical signal processed by the fiber optic rotation sensor, wherein the spectral monitor array monitors the spectrum of the optical signal to determine whether a shift in the scale factor of the optical signal has occurred, wherein the measured rotation of the rotation sensor is corrected in accordance with the scale factor shift determined by the spectral monitor array.

2. The system for stabilizing the scale factor of a broadband light source of claim 1, wherein the spectral monitor array includes a plurality of secondary bandpass filters each connected to receive at least a portion of the optical signal processed by the fiber optic rotation sensor and narrow the spectral width of the optical signal, wherein each of the secondary bandpass filters has a bandpass located within the bandpass of the primary filter.

3. The system for stabilizing the scale factor of a broadband light source of claim 2, wherein the aggregate bandpass of all of the secondary bandpass filters is substantially equal to the bandpass of the primary bandpass filter.

4. The system for stabilizing the scale factor of a broadband light source of claim 2, wherein the spectral monitor array further comprises a fiber optic coupler connected to receive the optical signal processed by the fiber optic rotation sensor, wherein the fiber optic coupler includes a plurality of output legs for directing at least a portion of the processed optical signal to each of the secondary bandpass filters.

5. The system for stabilizing the scale factor of a broadband light source of claim 4, where each one of the plurality of output legs is connected to a respective secondary bandpass filter.

6. The system for stabilizing the scale factor of a broadband light source of claim 2, wherein each of the plurality of secondary bandpass filters has a respective detector connected thereto for measuring the intensity of the optical signals output by the secondary bandpass filters.

7. The system for stabilizing the scale factor of a broadband light source of claim 6, wherein the measured intensities of the optical signals output by the secondary bandpass filters are utilized to determine the scale factor shift of the optical signal.

8. The system for stabilizing the scale factor of a broadband light source of claim 7, wherein the scale factor shift is reduced to a fraction of a part-per-million after the measured rotation is corrected in accordance with the determined scale factor shift.

9. The system for stabilizing the scale factor of a broadband light source of claim 2, wherein the secondary bandpass filters comprise Bragg Grating optical filters.

10. The system for stabilizing the scale factor of a broadband light source of claim 1, wherein the primary bandpass filter comprises a fiber optic bandpass filter which allows the propagation of wavelengths of light within its operating bandwidth while attenuating all wavelengths of light outside its operating bandwidth.

11. The system for stabilizing the scale factor of a broadband light source of claim 1, wherein the primary bandpass filter comprises an optical fiber situated between two fiber optic gratings, each of the gratings having a different periodicity so as to allow only wavelengths of light in a bandwidth between the periodicity of the gratings to propagate while attenuating all other wavelengths of light outside this bandwidth.

12. The system for stabilizing the scale factor of a broadband light source of claim 2, wherein the fiber optic rotation sensor comprises:

a multiplexer arranged to receive the optical signal from the primary bandpass filter;

an integrated optics device connected to the multiplexer for forming and processing counter-propagating waves from the optical signal;

a fiber optic sensing coil connected to the integrated optics device for generating a phase difference in the counter-propagating waves in relation to the rotation of the fiber optic rotation sensor, wherein the counter-propagating waves are combined in the integrated optics device to generate an interference pattern based upon the phase difference between the combined counter-propagating waves, the multiplexer further arranged to receive the interference pattern generated by the integrated optics device;

a first multiplexer output optical fiber connecting the multiplexer to the detector and arranged to guide the interference pattern to the detector; and a second multiplexer output optical fiber connecting the multiplexer to the spectral monitor array and arranged to guide the interference pattern to the spectral monitor array.

13. A method for stabilizing the scale factor of a broadband optical fiber source used in fiber optic rotation sensors, comprising the steps of:

providing a broadband optical signal from a broadband light source;

passing the broadband light signal through a primary bandpass filter to narrow the spectral width of the broadband optical signal;

outputting the filtered optical signal to a fiber optic rotation sensor;

processing the optical signal in the fiber optic rotation sensor to measure the amount of rotation of the fiber optic rotation sensor;

passing the processed optical signal through a spectral monitor array where the processed optical signal is analyzed to determine whether a scale factor shift has developed in the optical signal; and correcting the measured amount of rotation of the fiber optic rotation sensor in accordance with the determined scale factor shift.

14. The method of stabilizing the scale factor of a broadband optical fiber source of claim 13, wherein the spectral monitor array includes a plurality of the secondary bandpass filters, each of the secondary bandpass filters having a respective bandpass located within the bandpass of the primary filter, wherein the step of analyzing the processed optical signals comprises the steps of:

directing at least a portion of the processed optical signal to each of the secondary bandpass filters;

generating a plurality of secondarily filtered optical signals, wherein each of the plurality of secondarily filtered optical signals has a respective wavelength of the bandpass its associated secondary bandpass filter;

measuring the intensity of the plurality of secondarily filtered optical signals; and determining the scale factor shift of the processed optical signal by mathematically processing the measured intensities.

15. The method of stabilizing the scale factor of a broadband optical fiber source of claim 14, wherein the spectral monitor array includes a fiber optic coupler connected before the secondary bandpass filters for splitting the processed optical signal received by the spectral monitor array into a plurality of output signals and directing each of the plurality of output signals to a respective secondary bandpass filter.

16. The method of claim 14, wherein the primary bandpass filter and the secondary bandpass filters allow the propagation of wavelengths of light within their respective operating bandwidth while attenuating all wavelengths of light outside their respective operating bandwidth.

17. The method of claim 13, wherein the step of processing the optical signal in the fiber optic rotation sensor further comprises the steps of:

passing the filtered optical signal through a multiplexer connected to the primary bandpass filter;

forming and processing counter-propagating waves from the optical signal in an integrated optics device connected to the multiplexer;

generating a phase difference in the counter-propagating waves in relation to the rotation of the fiber optic rotation sensor in a fiber optic sensing coil connected to the integrated optics device;

combining the counter-propagating waves in the integrated optics device to generate an interference pattern based upon the phase difference generated between the combined counter-propagating waves;

guiding the interference pattern through the multiplexer to a detector connected to the multiplexer for measuring the rotation of the fiber optic rotation sensor.

18. The method of claim 14, wherein the aggregate bandpass of all of the secondary bandpass filters is substantially equal to the bandpass of the primary bandpass filter.

19. The method of claim 13, wherein the scale factor shift of the optical signal is reduced to a fraction of a part-per-million after the measured rotation is corrected in accordance with the determined scale factor shift.

* * * * *